United States Patent
Welty

(10) Patent No.: US 8,537,337 B2
(45) Date of Patent: Sep. 17, 2013

(54) METHOD AND APPARATUS FOR ANALYZING TREE CANOPIES WITH LIDAR DATA

(75) Inventor: Jeffrey J. Welty, Tacoma, WA (US)

(73) Assignee: Weyerhaeuser NR Company, Federal Way, WA (US)

( * ) Notice: Subject to any disclaimer, the term of this patent is extended or adjusted under 35 U.S.C. 154(b) by 587 days.

(21) Appl. No.: 12/645,348

(22) Filed: Dec. 22, 2009

(65) Prior Publication Data

US 2011/0149267 A1   Jun. 23, 2011

(51) Int. Cl.
*G01C 3/08* (2006.01)
(52) U.S. Cl.
USPC ......... 356/4.01; 356/3.01; 356/3.15; 356/4.1; 356/5.01
(58) Field of Classification Search
USPC ............. 356/3.01–3.15, 4.01–4.1, 5.01–5.15, 356/6–22, 28, 28.5
See application file for complete search history.

(56) References Cited

U.S. PATENT DOCUMENTS

| | | |
|---|---|---|
| 7,474,964 B1 | 1/2009 | Welty |
| 2004/0130702 A1* | 7/2004 | Jupp et al. ............... 356/5.01 |
| 2007/0291994 A1 | 12/2007 | Kelle et al. |
| 2008/0319673 A1 | 12/2008 | Welty et al. |
| 2009/0210205 A1 | 8/2009 | Sullivan et al. |

OTHER PUBLICATIONS

Couteron, Predicting Tropical Forest Stand Structure Parameters from Fourier Transform of Very High-Resolution Remotely Sensed Canopy Images, Jul. 21, 2005, Journal of Applied Ecology.*
Couteron, Pierre, et al.; Predicting tropical forest stand structure parameters from Fourier transform of very high-resolution remotely sensed canopy images; Paper to be published in the "Methodological Insights" section of Journal of Applied Ecology, Jul. 21, 2005, <URL:http:/hal.cirad.fr/docs/00/05/25/92/PDF/couteron_etal_Journal_of_Applied_Ecology_2005_preprint.pdf.
Korber, et al: "Multi-Channel Texture Classification Applied to Feature Extraction in Forestry", intel. conference, EIT-IEEE, 2005.
Falkowski, M.J., et al., "Automated Estimation of Individual Conifer Tree Height and Crown Diameter Via Two-Dimensional Spatial Wavelet Analysis of LiDAR Data," Canadian Journal of Remote Sensing 32(2):153-161, 2006.
Korber, C, et al., "Multi-Channel Texture Classification Applied to Feature Extraction in Forestry," University of Hamburg, IEEE 2005.
Final Office Action dated Jun. 15, 2012, U.S. Appl. No. 12/645,325.

* cited by examiner

*Primary Examiner* — Luke Ratcliffe
(74) *Attorney, Agent, or Firm* — Perkins Coie, LLP

(57) ABSTRACT

A system and method for analyzing a canopy of a forest by analyzing the spatial uniformity of LiDAR data point heights in a number of areas surrounding a tree top, where the areas are smaller than the expected size of the crown of the tree. In one embodiment, the spatial uniformity is quantified as a canopy closure vector based on an analysis of the LiDAR data point heights in a frequency domain. In one particular embodiment, the standard deviation of the frequency components in the cells of a number of rings centered around the average value in an FFT output matrix is used to quantify the spatial uniformity.

13 Claims, 9 Drawing Sheets

METHOD AND APPARATUS FOR ANALYZING TREE CANOPIES WITH LIDAR DATA

FIELD OF THE INVENTION

The technology disclosed herein relates to LiDAR data processing and, in particular, to techniques for processing LiDAR data to analyze tree canopies in a forest.

BACKGROUND

One of the tasks of a forester or forest manager is being able to accurately estimate timber volumes in a forest. In the past, volume estimates were made by sending a survey crew into a forest to obtain a sampling of tree measurements that include tree heights, diameters, spacings, etc. Estimates of timber volumes are then made by extrapolating the collected sample data to the size of the forest. While volume estimates based on sampling are generally accurate if the forest is relatively uniform, it is becoming increasingly expensive and/or logistically prohibitive to send survey crews into a sufficient number of sample areas within a large forest to obtain accurate data.

To address this problem, remote sensing is being used as an alternative technique to obtain sample data from the trees in a forest. One sensing method involves using light detection and ranging (LiDAR). With LiDAR, a low-flying aircraft, such as an airplane or helicopter, carries a LiDAR detection unit over a series of parallel paths that cover the forest area to be surveyed. The LiDAR detection unit transmits and receives laser pulses in a repeating back and forth sweep pattern for each path. The transmitted laser pulses are reflected off objects on the ground or in the air including: leaves and needles and branches, rocks, man made objects (houses, cars, telephone wires etc.), birds etc. The reflected laser pulses are detected by the LiDAR detection unit that records the time, direction, and strength of each reflected laser pulse. Because the altitude and speed of the aircraft are known as the reflected laser pulses are being detected, three dimensional coordinates for each reflected laser pulse can be determined.

While LiDAR sensing produces large amounts of data from the trees in the forest, it has been difficult to separate which laser pulses are reflected from different trees when the trees are closely spaced. The traditional approach is to analyze the LiDAR coordinate data for an object that might be a single tree. Irregularities in the data that are smaller than the expected tree size are smoothed out to make the analysis easier. The result is that the topological features that are smaller than the expected tree size are purposely ignored. However because tree sizes can vary significantly, it is difficult to know when a feature in the data is small enough to safely ignore. Therefore, laser pulses that are erroneously considered as has having been reflected from the same tree can result in an underestimate of the number of trees in a forest. Conversely, laser pulses that are erroneously considered has having been reflected from the different trees can result in an over estimate of the number of trees in a forest.

Given this problem, there is need for an improved technique of searching for individual trees in LiDAR data.

SUMMARY

To address the above-identified problem, the technology disclosed herein is a system and method for analyzing the canopy of a forest area with LiDAR data. In one embodiment, the spatial uniformity of LiDAR data point heights in a number of areas surrounding a tree top is used to determine information about the canopy from which a characteristic of the trees in the forest can be estimated. In one particular embodiment, LiDAR height data within the areas is converted to the frequency domain and subsequent analysis provides a measure of the spatial uniformity of LiDAR data point heights. In one embodiment, the characteristic is a crown size and the degree of spatial uniformity determined is used to adjust the size of an area where LiDAR points are considered has having been reflected from a single tree.

In one embodiment, a system includes a processor that is programmed to analyze a number of LiDAR data points within a search region. The processor is programmed to search the LiDAR data for points that may represent a tree top. For LiDAR data points that may represent a tree top, the processor is programmed to analyze the spatial uniformity of the heights of the LiDAR data points within a number of cells in the area surrounding the tree top. The size of the cells at which the LiDAR point heights are analyzed are preferably substantially smaller than the expected size of the tree crown. In one embodiment, the LiDAR data point heights are analyzed in the frequency domain and the uniformity is measured based on a variation of the powers in the frequency components.

In one embodiment, the processor is programmed to calculate a canopy closure vector that is used to adjust a size of a search area within which LiDAR data points are considered as having been reflected from a single tree. The size of the search area for those forest areas having a higher canopy closure vector is reduced compared with the size of the search area for forest areas having a lower canopy closure vector.

In one embodiment, the processor is programmed to analyze heights of the LiDAR data points using a two-dimensional Fast Fourier Transform (FFT). From an FFT output matrix, a measure of the variability of the frequency components is made. From the variability measurement, the canopy closure vector is calculated. In one particular embodiment, the processor is programmed to determine the standard deviations of the power of the frequency components in a number of rings of cells bounded by the second-fifth harmonics that surround the average value in the FFT output matrix. The standard deviations are used to compute the canopy closure vector (CCV) that varies with the amount of closure of the forest canopy. In one embodiment of the disclosed technology, the processor adjusts the size of the search area in which the coordinates of the LiDAR data points are considered as having been reflected from a single tree as a function of the calculated CCV.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

As will be appreciated by those skilled in the art of remote sensing, LiDAR data is most often obtained by flying an aircraft, such as an airplane, helicopter, etc., in a series of parallel paths over a geographic region. The aircraft carries a LiDAR transmitting and detecting unit that transmits a series of laser pulses in a repeating, back and forth sweep pattern. Some of the laser pulses are reflected back to the LiDAR detecting unit in the aircraft. By knowing the position, altitude and speed of the aircraft as well as the time between the transmission and detection of a laser pulse and the angle at which a pulse is detected, three-dimensional coordinates for each detected laser pulse can be determined and stored in a computer readable memory. In some cases, the intensity of each reflected laser pulse is also detected and stored. The three dimensional coordinates of the reflected laser pulses form the LiDAR data that is analyzed to determine information about the geographic region.

Once the LiDAR data is collected and stored in a computer readable file, the data is analyzed with a computer having one or more programmed processors. As described above, one difficulty with using LiDAR data to inventory a number of trees in a forest is being able to separate or distinguish laser pulses that are reflected from individual trees in the forest. U.S. Pat. No. 7,474,964, which is herein incorporated by reference in its entirety, discloses one technique to identify individual trees or items of vegetation. With this technique, the coordinates of the LiDAR data points are analyzed to determine if they are located at a position that is within a geographic area (e.g., a search area) defined by a digital crown umbrella or a digital branch umbrella associated with a previously identified item of vegetation. If the coordinates of a LiDAR data point are within the geographic area of a previously defined digital crown or branch umbrella, then a new digital branch umbrella is defined for the item of vegetation. Processing proceeds hierarchically by defining branch umbrellas for lower and lower LiDAR data points.

If the coordinates of a LiDAR data point are not within a geographic area encompassed by a previously defined digital crown or branch umbrella, then a new item of vegetation, such as a tree, is defined along with a corresponding a digital crown umbrella. The size of the new digital crown umbrella is typically selected based on the height of the LiDAR data point that marks the top of the tree.

Figure 1A:
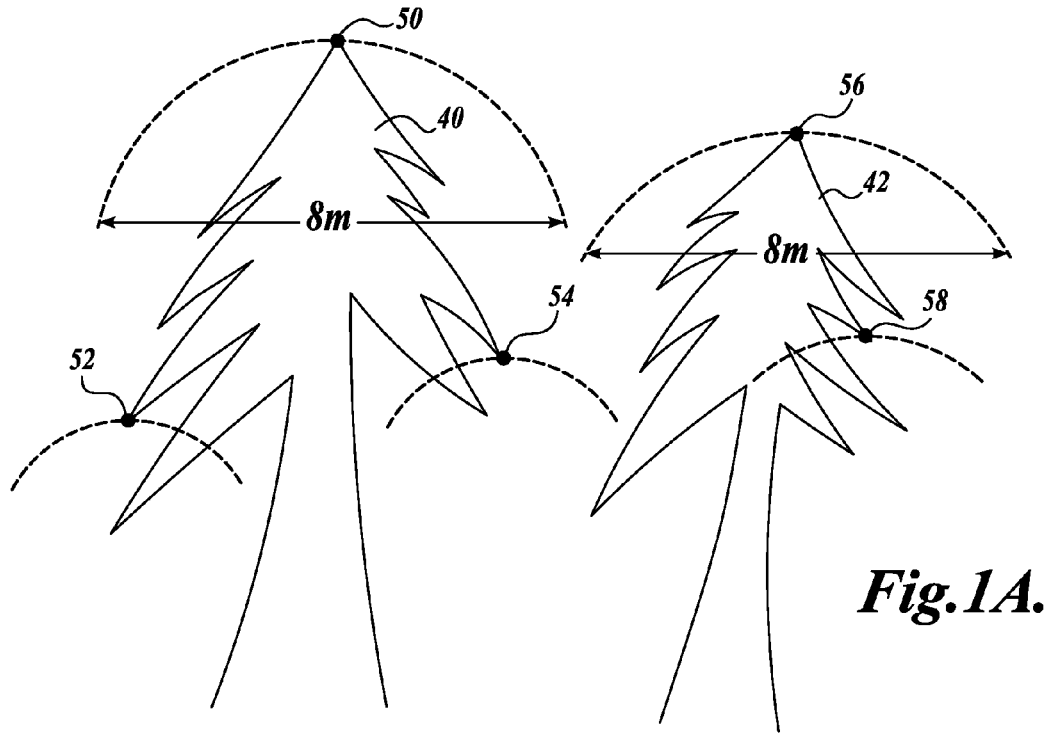
FIG. 1A illustrates a number of laser points reflected from a pair of non-closely spaced trees.

FIG. 1A illustrates a pair of trees 40, 42 that are growing relatively far apart. The tree 40 reflects a number of laser pulses that create corresponding LiDAR data points 50, 52, 54. Similarly, the tree 42 reflects a number of laser pulses that create corresponding LiDAR data points 56, 58. In accordance with the techniques described in the '964 patent, a digital crown umbrella is defined for the upper most LiDAR data point 50. The digital crown umbrella has a size selected to give a first approximation of the area occupied by the tree 40. In the example shown, the size of the digital crown umbrella defined for the LiDAR data point 50 is 8 meters in diameter. The coordinates of the LiDAR data points 52 and 54 are located within the area of the digital crown umbrella defined for LiDAR data point 50. Therefore, digital branch umbrellas are defined for the LiDAR data points 52 and 54. The total area occupied by the tree 40 can be estimated by the sum of the non-overlapping areas of the digital crown and branch umbrellas defined for the tree 40.

In the example shown in FIG. 1A, the coordinates of the LiDAR data point 56 are not within the area of a previously defined digital crown or branch umbrella. Therefore it is assumed that LiDAR data point 56 represents a separate tree 42 and a new digital crown umbrella is defined for the LiDAR data point 56. A digital branch umbrella is defined for a LiDAR data point 58.

Figure 1B:
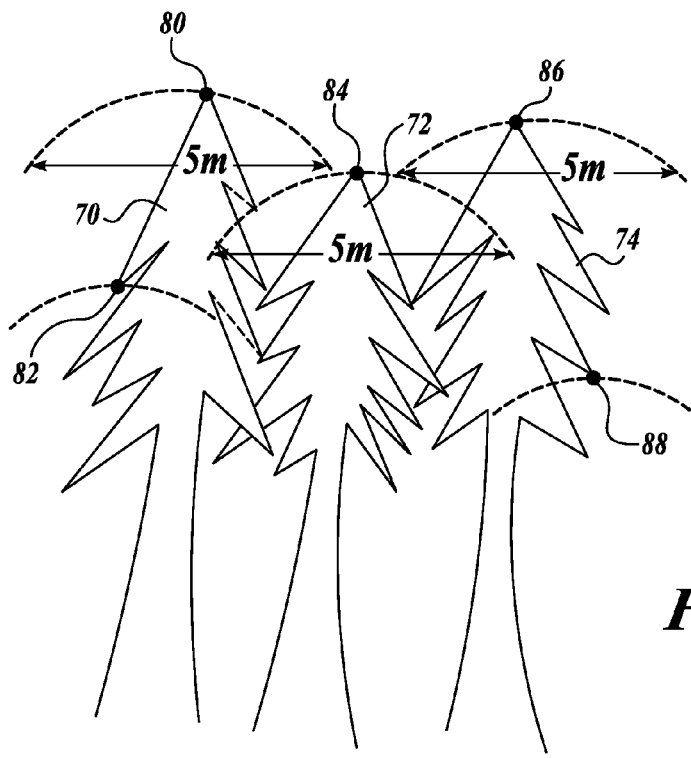
FIG. 1B illustrates a number of laser points reflected from a number of more closely spaced trees.

In the example shown in FIG. 1B, a series of trees 70, 72, 74 are shown as growing more closely together than the trees 40 and 42 shown in FIG. 1A. In this example, the size of the digital crown umbrellas defined for LiDAR data points 80, 84 and 86 have a smaller diameter, such as 5 meters. If the digital crown umbrellas defined for the LiDAR data points 80, 84, 86 had the same diameter as those defined for the trees shown in FIG. 1A, a computer may determine that there are only two trees in the stand instead of three. Therefore, the size of the digital crown umbrellas defined for the LiDAR data points 80, 84, 86 should be reduced when it is determined that trees or other items of vegetation are likely growing close together. On the other hand, the size of the digital crown umbrellas can be increased when it is determined that the trees or items of vegetation are likely growing farther apart.

The technology disclosed herein is a method and apparatus to analyze the canopy of a forest area based on the spatial uniformity of LiDAR data points heights at locations around the top of a tree. In one embodiment, the analysis is used to improve the techniques disclosed in the '964 patent to identify individual items of vegetation such as trees. Forest areas with a more closed canopy have trees tips or branches occupying almost every available space in the canopy and generally contain more trees per unit area with smaller crown diameters. Forest areas with trees spaced farther apart generally have a more open canopy with more open spaces and generally contain trees with a larger crown diameter. Therefore, the size of the digital crown or branch umbrellas can be adjusted in accordance with the amount of canopy closure for the forest area.

Although the technology is described with respect to its use in adjusting the size of the digital crown and/or branch umbrellas, it will be appreciated by those of ordinary skill in the art and others that the method and apparatus for analyzing the canopy of a forest area can be used for other purposes. For example, systems and methods that estimate the number of trees in an area by counting the number of LiDAR point peaks can scale the number of peaks with a factor that is related to the canopy closure in order to refine the estimate of the number of trees. In another alternative embodiment, the analysis of the canopy of the forest area can be used to form digital signatures that are used to predict other characteristics of the trees in the forest such as the species of trees, their age, relative health etc.

In one embodiment, the canopy of a forest area is analyzed based on the spatial uniformity of the height components of the LiDAR data point heights surrounding a tree top. In one particular embodiment, an area of LiDAR data point heights is analyzed in the frequency domain using a Fourier transform to determine the variability of the frequency components of the data point heights in two dimensions. The amount of variation in the frequency components is indicative of an amount of canopy closure. In one embodiment, the variation in the frequency components is quantified as a canopy closure vector (CCV).

Figure 2A:
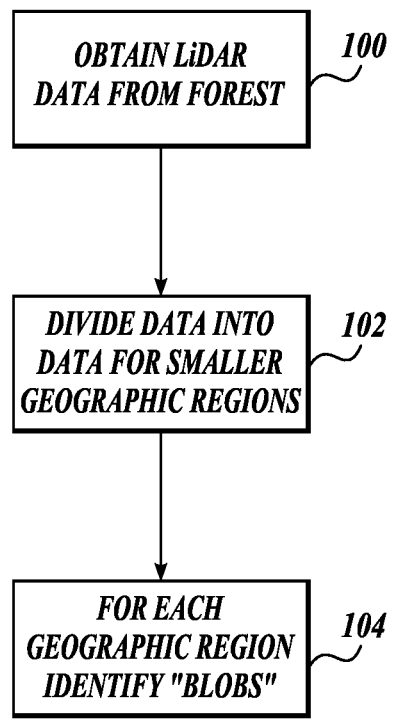
FIGS. 2A-2B are flow charts of one method of analyzing a canopy of a forest area in accordance with an embodiment of the disclosed technology.
Figure 2B:
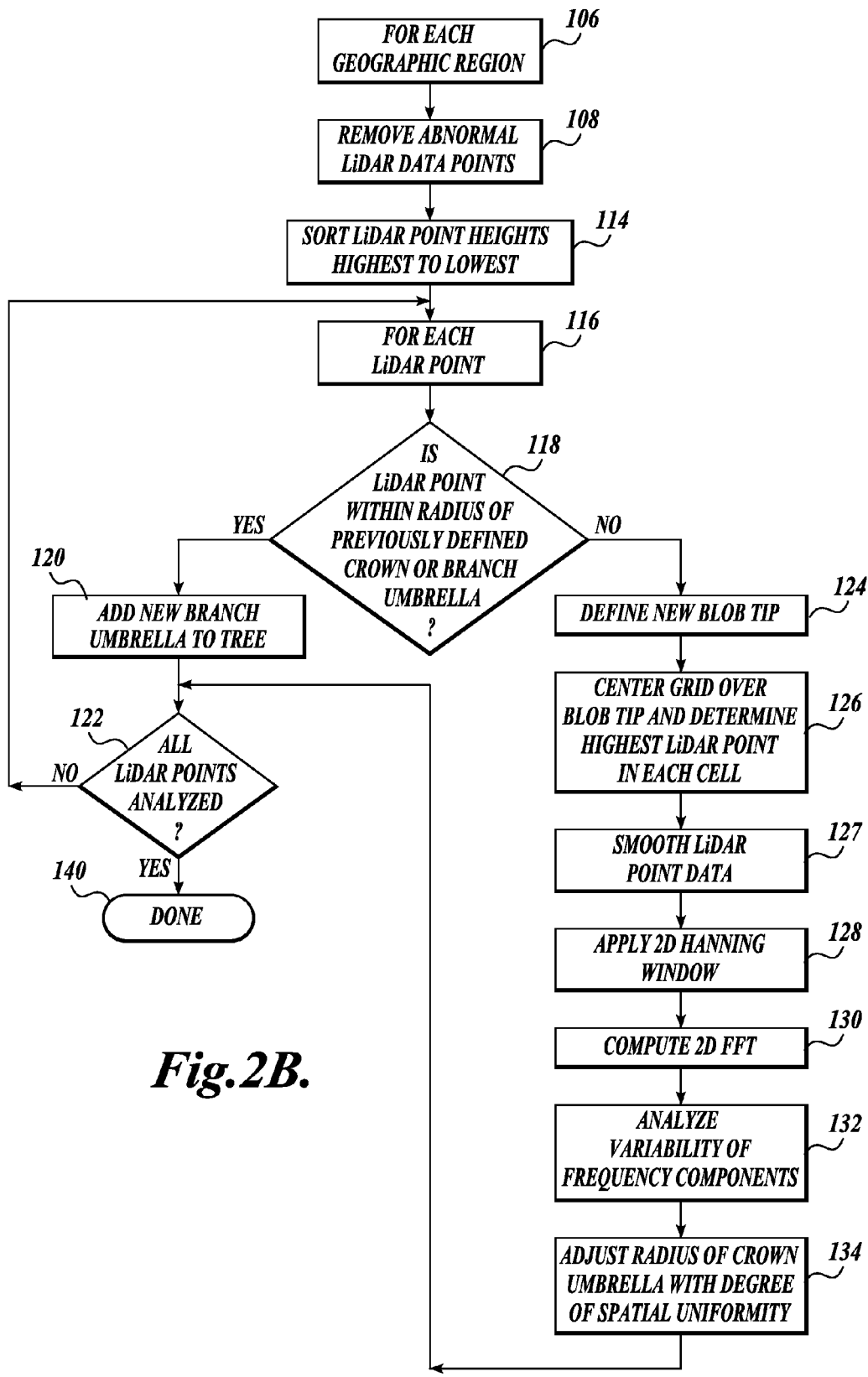

FIGS. 2A-2C are flowcharts of one method of analyzing the canopy of a forest area from the spatial uniformity of the LiDAR data point heights in accordance with an embodiment of the disclosed technology. In the description below, a point cloud of LiDAR data points that may represent a tree or other item of interest is called a "blob" for lack of a better term.

Beginning at step 100, raw LiDAR data from a forest is obtained. Because the amount of LiDAR data produced is frequently massive, the data is usually divided into data having coordinates from smaller geographic regions of interest depending on the speed and memory of a computer that will be used to analyze the data at step 102. In one embodiment, the LiDAR data is divided into areas of approximately 25,000 data points to speed processing of the data. The 25,000 LiDAR data points include a buffer region that surrounds the region of interest. The buffer region is useful in case a tree top is located at the edge of the region of interest as will be described below. For each smaller geographic region of interest, a computer system begins to identify blobs (e.g., possible tree tops) in the LiDAR data at a step 104.

As shown in FIG. 2B, one way of identifying one or more blobs in the LiDAR data is to begin a loop at 106 where the LiDAR data for each geographic region is analyzed with a programmed processor. At 108, the processor removes any abnormal data points (e.g., LiDAR data points created from birds, power lines, tall buildings, etc.) Typically these abnormal data points are identified as having a height that is too high to come from an item of interest such as a tree.

At step 114, the LiDAR data points for the geographic region of interest are sorted by height, from highest to lowest. Beginning with the highest sorted LiDAR data point, it is determined at step 118 if the coordinates of the LiDAR data point are within an area of a previously defined digital crown or branch umbrella. If so, processing proceeds to step 120 to define a new digital branch umbrella for the LiDAR data point. The new digital branch umbrella is associated with a previously identified blob (i.e., tree) tip. If the answer to step 118 is no, then the coordinates of the LiDAR data point are not located within the area of a previously defined digital crown or branch umbrella and a new blob (i.e., tree) tip is defined at step 124.

At step 126, the LiDAR points within a grid having its center at the newly defined blob tip are analyzed. The grid contains a number of cells each of which defines a geographic area around the newly located blob tip that may include a number of LiDAR data points. If the grid extends beyond the region of interest being processed because the blob tip is located at or near the edge of the region of interest, data from the buffer region is used to fill in the grid. For ease of processing, the number of cells in the grid is preferably a multiple of 2. In one embodiment, the grid has an area of 20×20 meters and is divided into 32×32 cells with each cell representing an area of 0.625×0.625 meters. It is important that the area of each cell in the grid be substantially smaller than the expected size of the tree crowns in the forest being analyzed so that small areas of variations in the LiDAR data point heights can be detected. As a practical matter, the smallest cell size is limited by the area in which LiDAR data can be expected. The maximum cell that could be used is approximately ¼ of the area of the tree crown. In one embodiment in which Loblolly pine were analyzed, the approximate tree crown is between 6 and 9 meters in diameter. Therefore using a cell size of 0.626× 0.625 meters means that the LiDAR data point heights are analyzed at approximately 72-162 locations around each tree top.

Some cells in the grid may not have any LiDAR data points in them. On the other hand, some cells may have multiple LiDAR data points in the same cell. For those cells with multiple LiDAR data points, a single LiDAR data point is selected for the cell. In one embodiment, the LiDAR data point having the greatest height in the cell is selected at step 126. However it would also be possible to use an average or some other combination of LiDAR data point heights for processing.

At a step 127, a smoothing function is applied to the LiDAR data point heights for each of the cells. In one embodiment, a 3×3 averaging function is used to partially smooth the LiDAR data point heights. Next, an additional windowing function is applied at step 128 so that the heights of the LiDAR data points at the edges of the grid approach 0. In one embodiment, the windowing function is a Hanning window that scales the LiDAR data point heights in the cells of the grid with a number that varies between 1 at the center of the grid and 0 at the edges of the grid.

After windowing, the heights of the LiDAR data points are analyzed in the frequency domain at step 130. In one embodiment, a two dimensional Fast Fourier Transform (FFT) is applied to the smoothed and windowed heights of the LiDAR data points in the grid. However, other frequency analysis tools such as a wavelet analysis could also be performed, as well as analysis in the spatial domain (for example clumping analyses).

At step 132, the variability of the frequency components of the LiDAR data point heights in the FFT output matrix is analyzed and quantified.

At step 134, the radius of the digital crown umbrella defined for the new blob tip is selected based in part on the degree of variability determined at step 132.

After step 134, processing returns to step 122 and it is determined if all LiDAR data points in the geographic area being analyzed have been processed. If not, processing returns to step 116 for the next LiDAR data point. Otherwise processing ends at step 140.

As will be understood by those of ordinary skill in the art and others, the two dimensional FFT produces an indication of the magnitude of a number of pairs of frequency components in the LiDAR data point heights in both the X and Y directions in the area of the grid that surrounds the blob tip.

Figure 3:
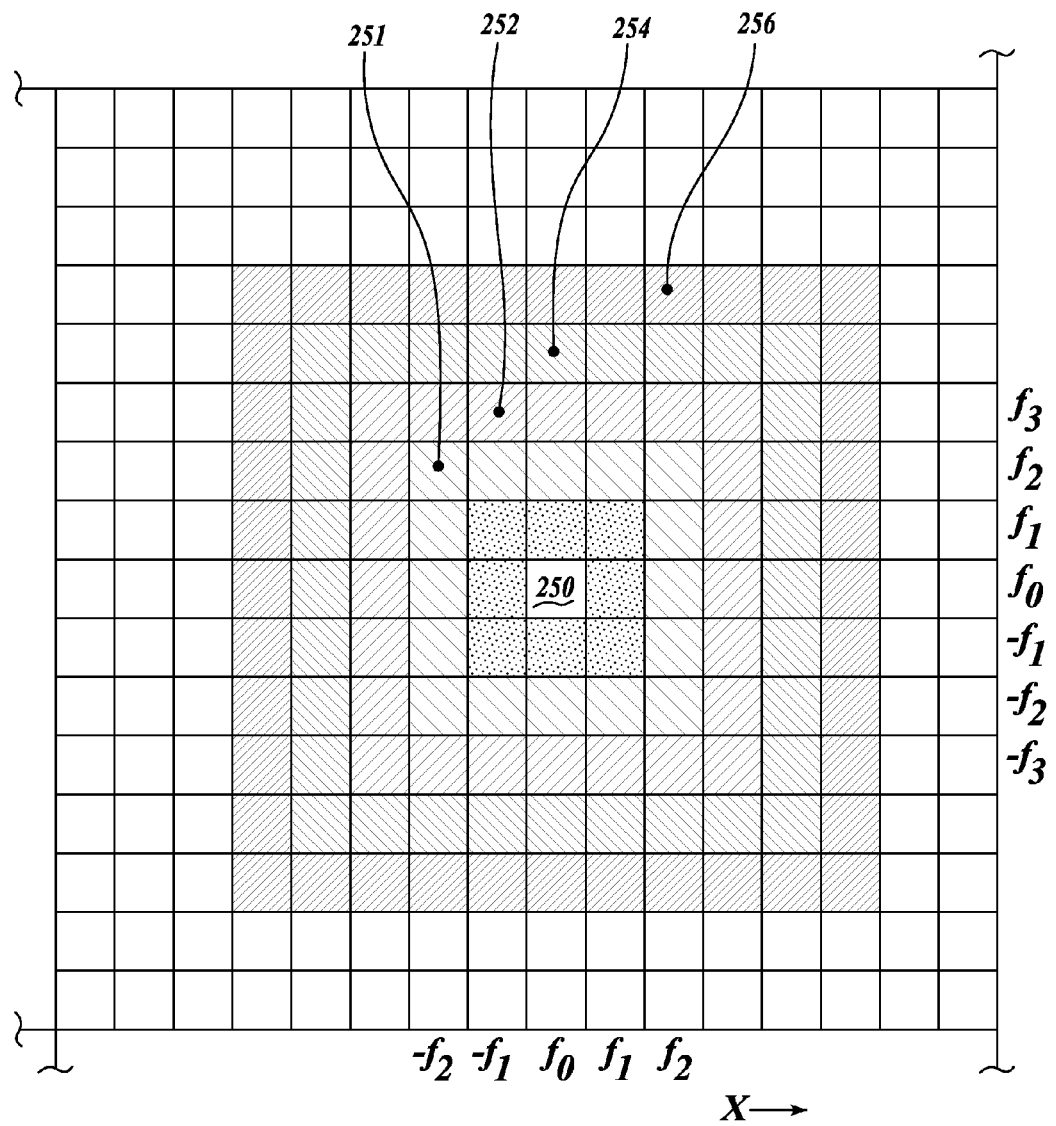
FIG. 3 illustrates a portion of a two-dimensional Fast Fourier Transform (FFT) output matrix produced in accordance with one embodiment of the disclosed technology.

FIG. 3 illustrates a portion of a two dimensional FFT output matrix that shows the magnitude of the pairs of frequency components from the LiDAR pulse data. Depending on the computer program used to compute the FFT, each cell in the FFT output matrix can store different information regarding the magnitude of the frequency components. The output matrix shown is stored as a computer readable array of cells, where each cell stores the magnitude of a pair of frequency components in each of the X and Y directions. As is common in two dimensional FFT analysis, the frequency matrix is arranged so the average value is located at the center of the matrix, and frequency increases in either the row or column dimension as you move away from the average value cell. This rearrangement is typically accomplished by swapping the NW and SE quadrants, and swapping the NE and SW quadrants of the resultant matrix from classic FFT methodology.

A center cell 250 of the FFT output matrix stores the average or DC value of the LiDAR data pulse heights in the area included within the grid that surrounds the blob tip. Around the center cell 250 are cells that store the magnitude of pairs of harmonic frequency components.

In one embodiment of the disclosed technology, the canopy of the forest in the area of the grid surrounding the blob tip is analyzed based on the variability of the frequency components in the FFT output matrix. Canopies that are more closed exhibit less variability of frequency components (e.g., the values in the cells of the FFT output matrix look more uniform) while canopies that are more open exhibit more variability in the magnitude of the frequency components in the FFT output matrix.

In one embodiment, the variability of the frequency components is determined by analyzing the power of the frequency components in a number of rings that surround the cell 250 that stores the average value in the FFT output matrix. In one embodiment, the rings include a second ring 251 having cells that store the magnitudes of the second harmonic in the X and Y directions with lower harmonics and the average value. A third ring 252 has cells that store the magnitudes of the third harmonic in the X and Y directions with lower harmonics and the average value. A fourth ring 254 has cells that store the magnitudes of the fourth harmonic in the X and Y directions with lower harmonics and the average value. A fifth ring 256 has cells that store the magnitudes of the fifth harmonic in the X and Y directions with lower harmonics and the average value. In one embodiment, the variability of the frequency components is quantified based on the standard deviation of the power of the frequency components in the cells of each ring 251, 252, 254, 256.

From the standard deviations in frequency component power, the variability of the frequency components is quantified as a canopy closure vector (CCV) according to the equation:

$$CCV = \sqrt{(sd2+sd3)^2 + (sd4+sd5)^2}$$

where sd2 is the standard deviation of the frequency power in the cells of the second ring 251. Sd3 is the standard deviation of the frequency power in the cells of the third ring 252. Sd4 is the standard deviation of the frequency power in the cells of the fourth ring 254 and sd5 is the standard deviation of the frequency power in the cells of the fifth ring 256.

Although the disclosed embodiment of the technology analyzes the variations of the powers of the frequency components within the rings that store the second-fifth harmonics, it will be appreciated that other combinations of frequency components could be used or other metrics (such as the variation in the magnitudes of the frequency components) could be used to analyze the uniformity of the spatial distribution of the heights of the LiDAR data points surrounding a tree top.

Figure 4A:
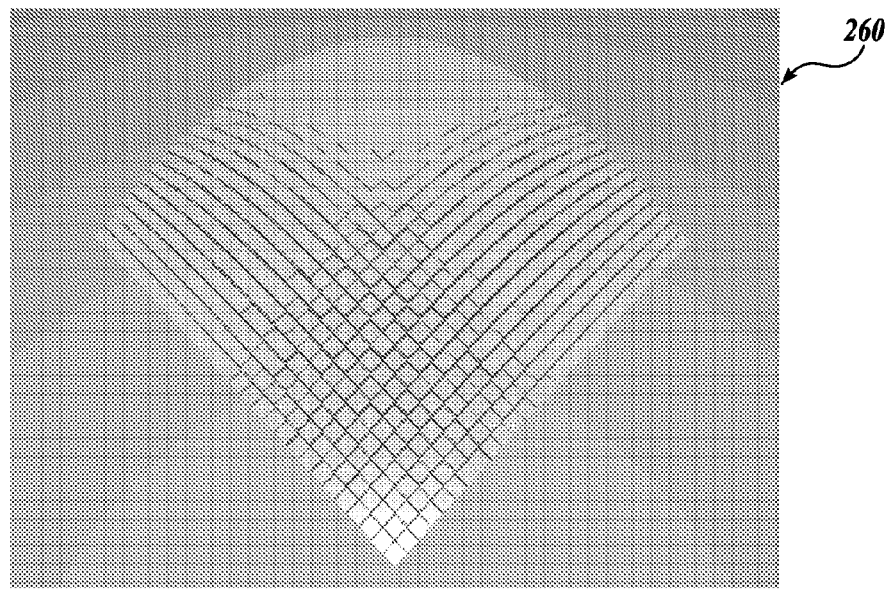
FIGS. 4A-4F illustrate surfaces with different patterns of height differences and their corresponding two dimensional FFTs.
Figure 4B:
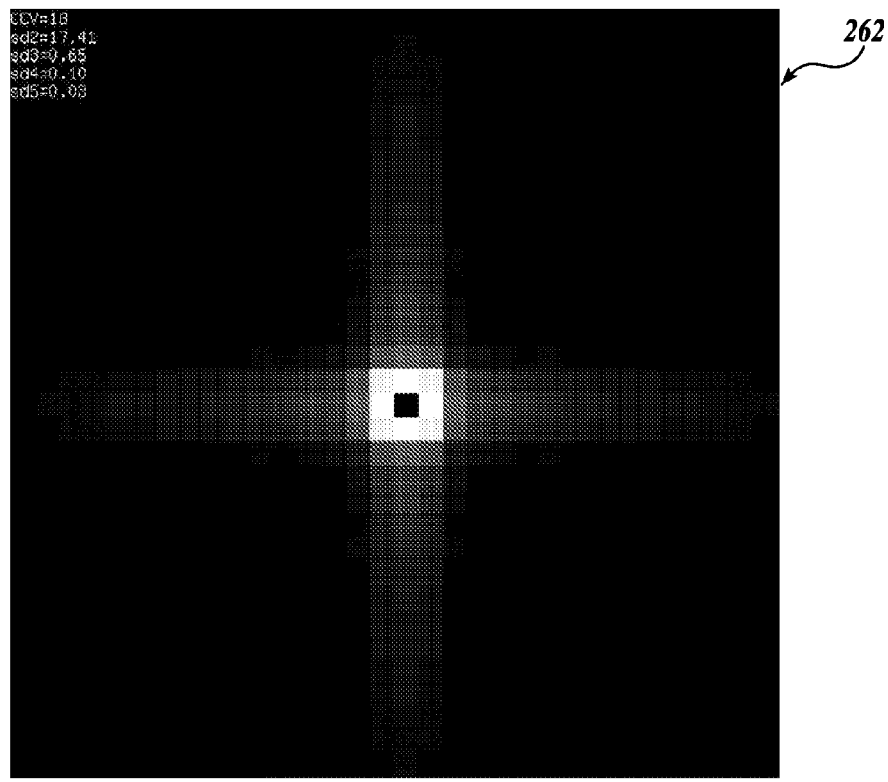

FIGS. 4A-4F illustrate three example surfaces of LiDAR height data and their corresponding two dimensional FFT output matrices. FIG. 4A illustrates a portion of a curved surface 260 that is radially symmetric and decreases in height uniformly. The surface 260 produces the FFT output matrix 262, as shown in FIG. 4B, with a distribution of frequency powers that is relatively symmetric about a center average value. The standard deviation in the fourth and fifth rings around the average value is relatively low (0.1 and 0.03 respectively) The surface 260 would therefore represent a highly closed canopy.

Figure 4C:
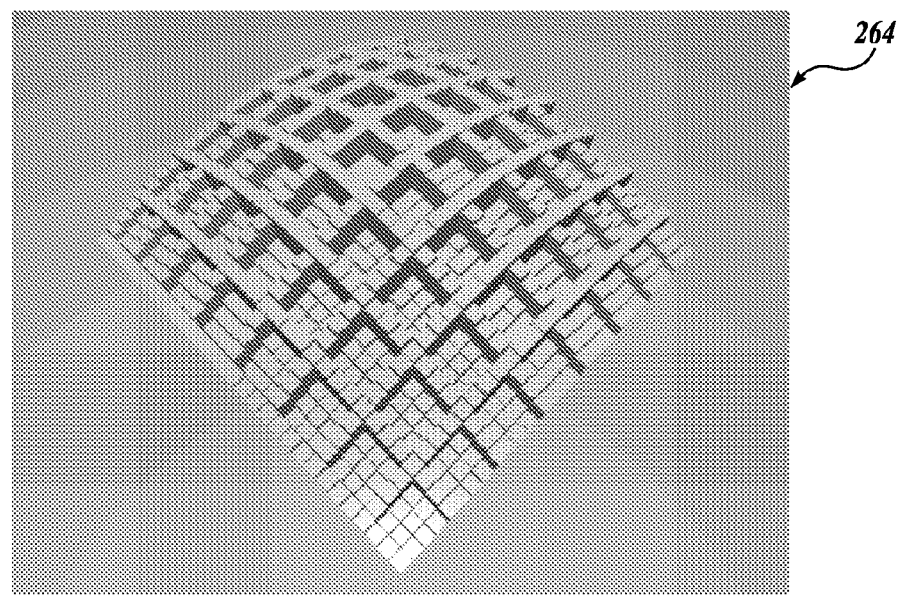
Figure 4D:
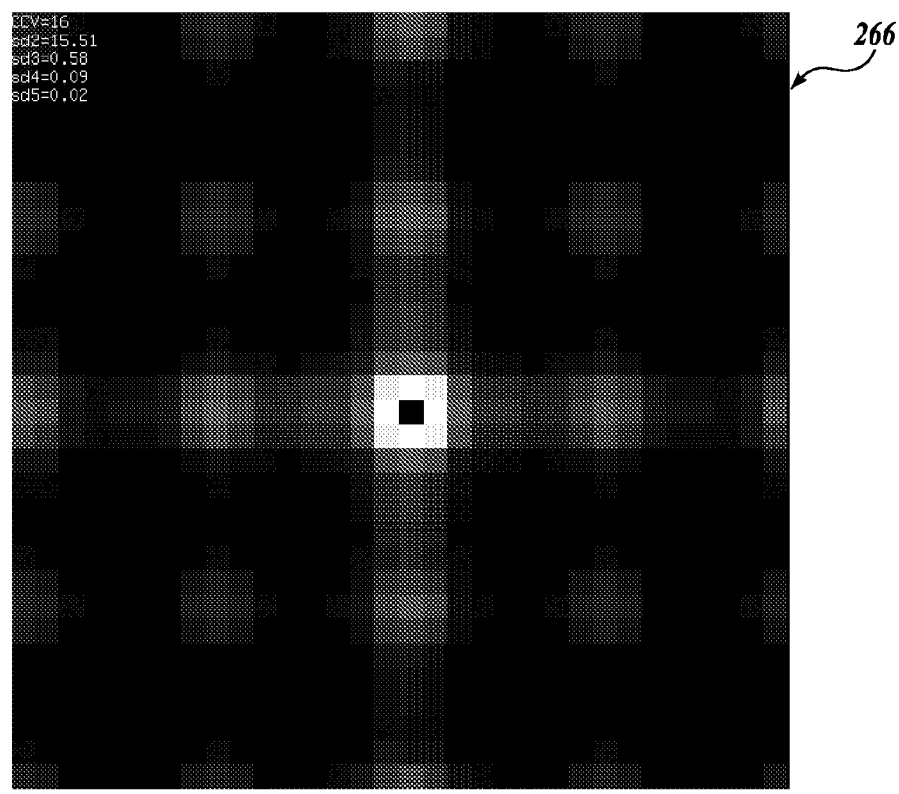

In FIG. 4C, a surface 264 is generally radially symmetric around its high point and has a radially symmetric, uniform pattern of height variations. The surface 264 produces the FFT output matrix 266, as shown in FIG. 4D, where the powers of the frequency components are generally symmetric about the average value in the output matrix. The standard deviation in the fourth and fifth rings is also low (0.09 and 0.02 respectively).

Figure 4E:
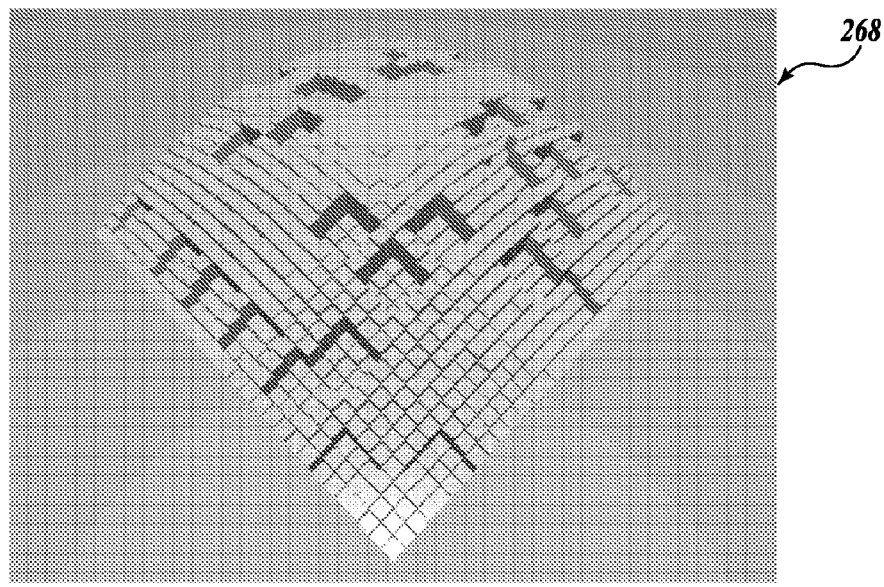
Figure 4F:
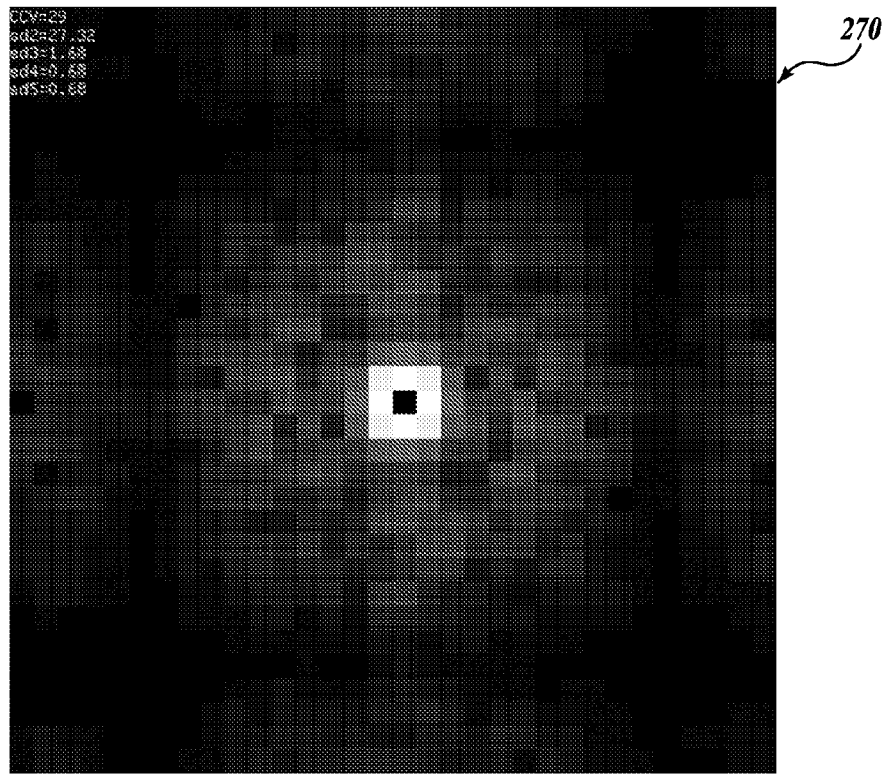

FIG. 4E illustrates a surface 268 with fewer height variations that are randomly distributed. In this example, the surface 268 produces an FFT output matrix 270, as shown in FIG. 4F, with frequency powers in the cells that are much less symmetric and less uniform. As can be seen, the standard deviation of the powers within the cells of each of the second-fifth rings in greater than in the other examples. The surface 268 is representative of a more open canopy.

It has been determined that a high CCV is indicative of a more open canopy and therefore fewer trees in the region of interest. The high CCV is result of gaps in the canopy where there are non-uniform variations in the heights of the LiDAR data. Conversely, a low CCV is indicative of a more closed canopy and therefore a greater number of trees per unit area. Closed canopies contain branches and leaves/needles in virtually every space in the canopy and the uniformity of the distribution of the power of the harmonic components in the FFT output matrix is greater.

As indicated above, one use of the determined spatial uniformity of the heights of the LiDAR data is to adjust the size of the digital crown umbrella that is assigned to a blob tip. The digital crown umbrella therefore initially defines the area where laser pulses are assumed to have been reflected from a single item of vegetation or tree.

Figure 5:
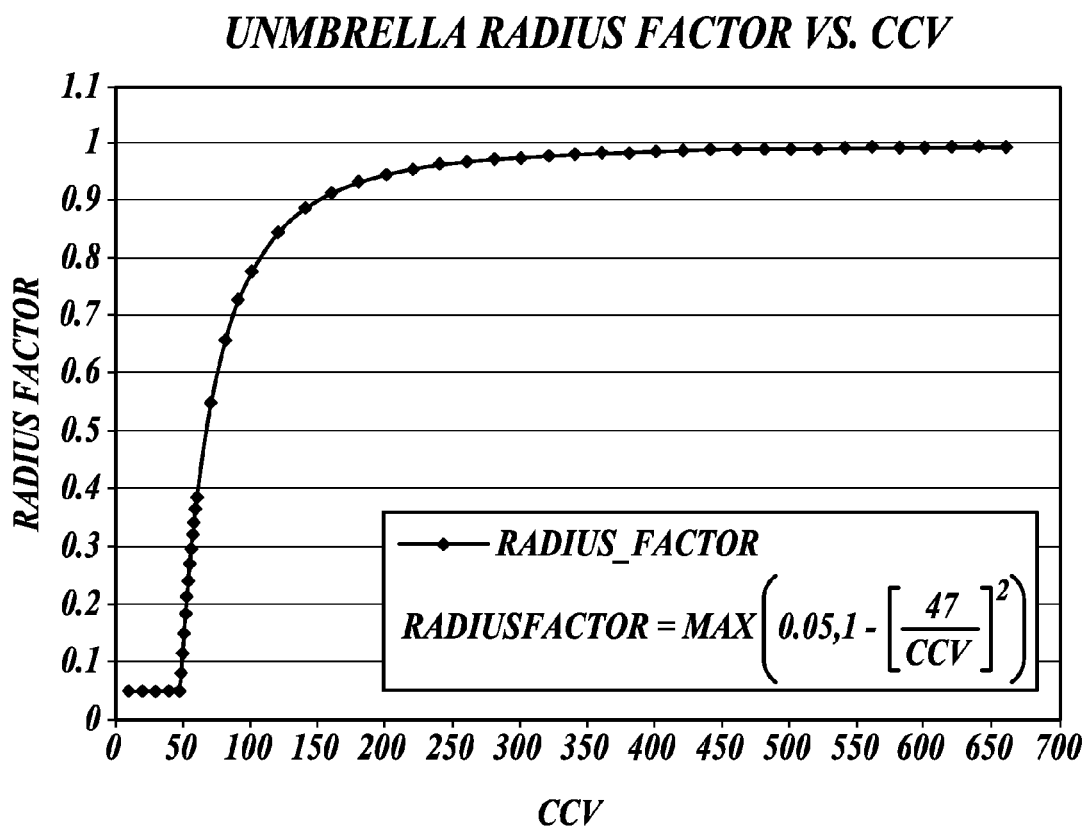
FIG. 5 illustrates one suitable function that determines a factor by which a size of a search area used to identify individual trees in LiDAR data is varied with a canopy closure vector calculated in accordance with an embodiment of the disclosed technology.

FIG. 5 illustrates one suitable function 275 that relates a fractional factor by which a size of a digital crown umbrella is adjusted based on a computed closed canopy vector (CCV). As can be seen, as the CCV increases, the size of the multiplier to applied to the digital canopy umbrella size increases. The CCV can vary continuously between trees that are spaced far apart from one another, to trees in a stand that have been thinned, to trees growing in a closed canopy. The value used for a base digital crown umbrella size can be based on the height of the LiDAR point height of the tree top or other factors including species of tree, location, climate/growing region etc. The particular function or coefficients of the function that relate the uniformity of the spatial variations in the LiDAR data point heights to the size of the crown umbrella may need to be determined from a fitting of the results of the FFTs against one or more sets of ground truth data.

Once the size of the digital crown umbrella is set for the blob tip, the next LiDAR pulse in the geographic region of interest is then analyzed and the process can then begin again.

Figure 6:
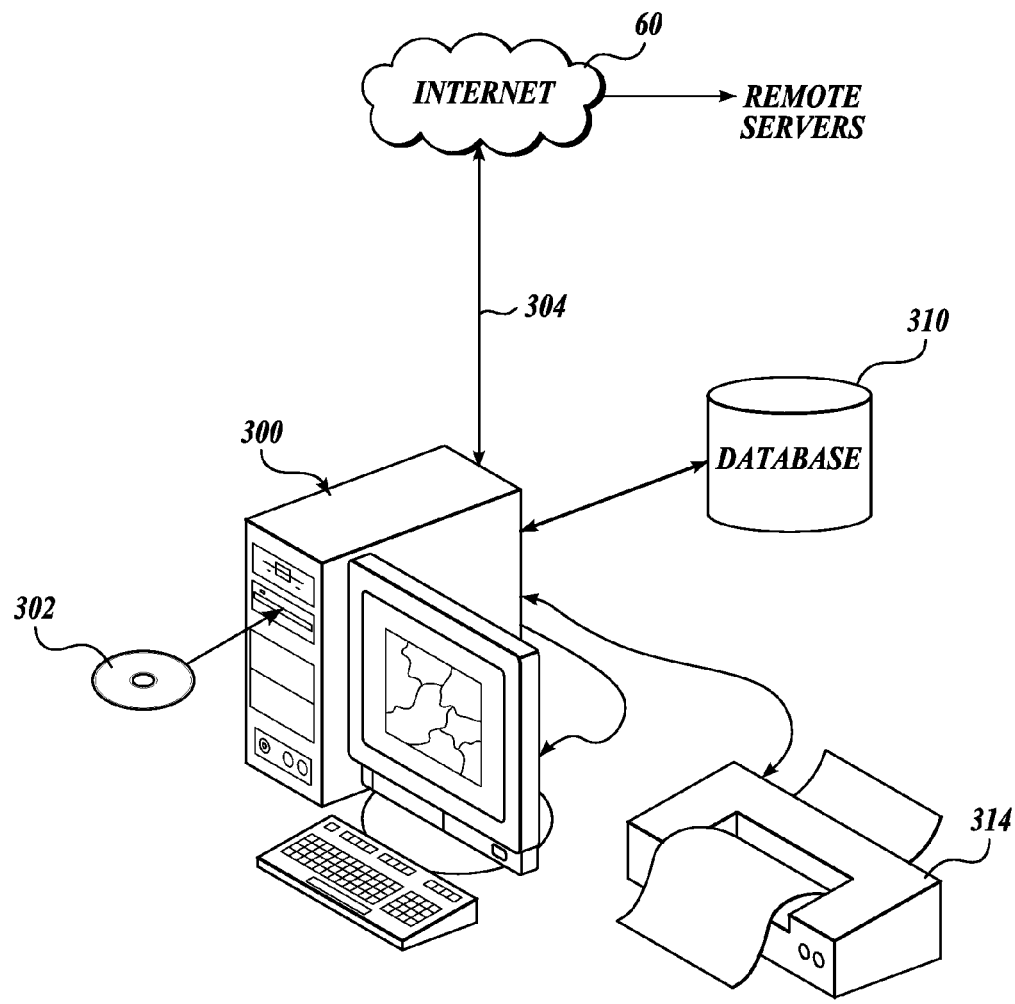
FIG. 6 illustrates a representative computer system for analyzing LiDAR data to analyze the canopy of a forest area in accordance with an embodiment of the disclosed technology.

FIG. 6 illustrates a representative computer system that can analyze the canopy of a forest area based on the spatial uniformity of heights in the LiDAR point data in accordance with the disclosed technology. The computer system 300 includes a one or more processors that are programmed to execute a series of program instructions that implement the techniques described above. The computer may be a stand alone or networked, general purpose, or special purpose computer system including one or more programmed processors. Depending on the amount of memory available and the speed of the processor(s), the computer system may also be implemented in a hand held or laptop computing device.

Instructions for the processor(s) may be stored in an external memory or a memory within the computer system or on a computer-readable storage media 302 (CD, DVD, hard drive, etc.), or received over wired or wireless computer communication link 304, such as the Internet. The computer system 300 analyzes the canopy of the forest area within an area of interest based on the spatial uniformity of the heights of the LiDAR data. In addition, the computer may use the canopy closure vector to adjust the size of the digital umbrellas that are used to estimate the number of trees in a forest area. With the spatial uniformity determined, the canopy closure vector and/or the forest inventory data can be stored in a database 310 or output to a computer-readable media, to a video display 312 or to a printer 314 etc.

While illustrative embodiments have been illustrated and described, it will be appreciated that various changes can be made therein without departing from the scope of the invention. For example, as indicated above, the information obtained from analyzing the spatial uniformity of the heights of the LiDAR point data surround a tree top can be used as a digital signature in order to estimate characteristics of a tree other than its crown size such as the species of tree, the age of the trees, the relative health of the trees etc. For example, certain trees may grow with characteristic canopy height variations that can be used to identify the type of tree. In this embodiment, the spatial uniformity of LiDAR data point heights is determined for an area in the forest and the result is matched to data that has been calculated from ground truth trees. Based on the level of match detected, it is possible to assign the characteristic determined from the ground truth trees to the trees that produced the LiDAR data.

In another embodiment, the spatial uniformity of the LiDAR data point heights can be determined for any area of interest in the forest canopy, not just those areas surrounding an identified tree top. The uniformity of the height variations of the LiDAR data points in the area of interest is determined by analyzing the LiDAR data point heights within a number of areas that are smaller than an expected crown size of the trees or other types of vegetation in the area of interest. The quantified uniformity of the height variations can then be used to predict characteristic(s) of the trees or other vegetation in the area of interest.

In one embodiment, the uniformity of the height variations can be quantified by placing the FFT grid over any section of LiDAR data, calculating the FFT and determining the CCV from the FFT output matrix as described above. The CCV from the area of interest is then compared with previously determined CCVs that are correlated to characteristics determined from ground truth data. Such characteristics include, but are not limited to, species, age of trees, trees per unit area, tree volumes, tree health, fertilization requirements, etc.

In addition, although the disclosed embodiments of the technology analyze the spatial uniformity of the LiDAR data point heights in the frequency domain, it will be appreciated that other techniques such as pattern recognition, for example, a cluster analyses, or other two-dimensional image processing techniques could be used in the spatial domain to quantify the spatial uniformity. Therefore, it is therefore intended that the scope of the invention be determined from the following claims and equivalents thereof.

The embodiments of the invention in which an exclusive property or privilege is claimed are defined as follows:

1. A system for analyzing a canopy of an area of a forest from LiDAR data, comprising:
a processor programmed to:
analyze a number of LiDAR data point heights to locate a LiDAR data point that represents a tree top;
quantify a two-dimensional spatial uniformity of LiDAR data point heights within a grid surrounding a location of the LiDAR data point representing the tree top, wherein the grid includes a number of cells where each cell is smaller than an expected size of the crown of the tree;
adjust a size of a first approximation of an area occupied by the tree based on the quantified spatial uniformity of the LiDAR data point heights; and
determine if additional LiDAR data points are within the first approximation of the area occupied by the tree and if so adding an area associated with a branch such that the area of the tree can be determined from the first approximation and the added areas associated with the branches.

2. The system of claim 1, wherein the processor is programmed to quantify the two-dimensional spatial uniformity of the LiDAR data point heights by analyzing the LiDAR data points in a frequency domain.

3. The system of claim 2, wherein the processor is programmed to smooth and window the LiDAR point heights in the grid surrounding the location of the LiDAR data point representing the tree top and to analyze the smoothed and windowed LiDAR data point heights using a two-dimensional Fast Fourier Transform (FFT).

4. The system of claim 3, wherein the processor is programmed to quantify the two-dimensional spatial uniformity of LiDAR data point heights by calculating a standard deviation of the powers of the frequency components in cells of a number of rings within an FFT output matrix that surround an average value.

5. The system of claim 4, wherein the processor is programmed to calculate the standard deviation of the powers of the frequency components in the cells of the 2nd, 3rd, 4th and 5th rings that surround the average value in the FFT output matrix.

6. The system of claim 5, wherein the processor is programmed to quantify the two-dimensional uniformity of the LiDAR data point heights as a canopy closure vector defined by $CCV=\sqrt{(sd2+sd3)^2+(sd4+sd5)^2}$, where sd2 is the standard deviation of the power of the frequency components in the cells of the second ring, sd3 is the standard deviation of the power of the frequency components in the cells of the third ring, sd4 is the standard deviation of the power of the frequency components in the cells of the fourth ring and sd5 is the standard deviation of the power of the frequency components in the cells of the fifth ring.

7. A computer-readable storage media containing instructions that when executed cause a processor to:
identify a LiDAR data point that represents a tree top;
determine a two-dimensional spatial uniformity of a number of LiDAR data point heights within a grid including a number of cells that surround the location of the LiDAR data point that represents the tree top, wherein each cell is smaller than an expected size of the crown of the tree;
increase a size of a first approximation of an area occupied by the tree as the determined spatial uniformity of the number of LiDAR data point heights decreases;
determine if additional LiDAR data points are within the first approximation of the area occupied by the tree and if so, adding an area associated with a branch such that the area of the tree can be determined from the first approximation and the added areas associated with the branches.

8. A computer-readable storage media containing instructions that when executed, cause a processor to analyze a canopy of an area of a forest by:

analyzing a number of LiDAR data point heights to locate a peak that represents a tree top;

quantifying a two-dimensional spatial uniformity of LiDAR data point heights within a number of areas surrounding a location of the tree top, wherein each area is substantially smaller than an expected size of the crown of the tree; and adjust a size of a first approximation of an area occupied by the tree based on the spatial uniformity of the LiDAR data point heights; and determine if additional LiDAR data points are within the first approximation of the area occupied by the tree and if so adding an area associated with a branch such that the area of the tree can be determined from the first approximation and the added areas associated with the branches.

9. The computer-readable storage media of claim 8, wherein the instructions include instructions that when executed cause the processor to quantify the two-dimensional spatial uniformity by analyzing the LiDAR data point heights using a two-dimensional Fast Fourier Transform (FFT).

10. The computer-readable storage media of claim 9, wherein the instructions include instructions that when executed cause the processor to analyze the two-dimensional spatial uniformity of the LiDAR data point heights by calculating a standard deviation of the powers of the frequency components in cells of a number of rings within an FFT output matrix that surround an average value.

11. The computer readable storage media of claim 10, wherein the instructions include instructions that when executed cause the processor to calculate a standard deviation of the powers of the frequency components in the cells of the 2nd, 3rd, 4th and 5th rings that surround the average value in the FFT output matrix.

12. The computer readable storage media of claim 11, wherein the instructions include instructions that when executed cause the processor to quantify the two-dimensional spatial uniformity of the LiDAR data point heights as a canopy closure vector (CCV) by calculating $CCV=\sqrt{(sd2+sd3)^2+(sd4+sd5)^2}$ where sd2 is the standard deviation of the power of the frequency components in the cells of the second ring, sd3 is the standard deviation of the power of the frequency components in the cells of the third ring, sd4 is the standard deviation of the power of the frequency components in the cells of the fourth ring and sd5 is the standard deviation of the power of the frequency components in the cells of the fifth ring.

13. A system for estimating a number of trees in a forest area from LiDAR data, comprising:

a processor configured to:

identify a LiDAR data point that represents a tree top;

determine a two-dimensional spatial uniformity of a number of LiDAR data point heights within a number of areas that surround the tree top, wherein each area is substantially smaller than an expected size of the crown of the tree; and increase an initial approximation of an area occupied by the tree as the determined two-dimensional spatial uniformity of a the number of LiDAR data point heights decreases, wherein additional LiDAR data points having coordinates that within the initial approximation of the area are determined to be associated with the same tree; and determine if additional LiDAR data points are within the first approximation of the area occupied by the tree and if so adding an area associated with a branch such that the area of the tree can be determined from the first approximation and the added areas associated with the branches.

\* \* \* \* \*